Feb. 16, 1926.
J. A. CHEAPE
ANTISKID CHAIN
Filed March 21, 1925    2 Sheets-Sheet 2
Fig. 2.
Fig. 3.
1,573,631
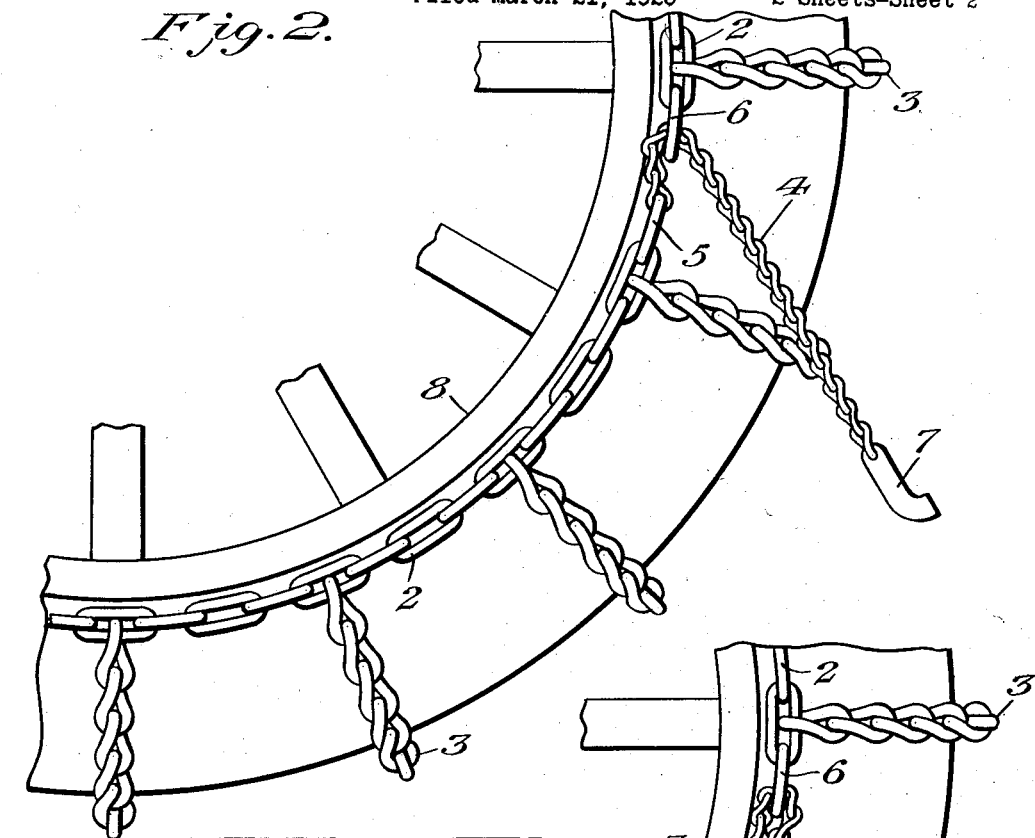
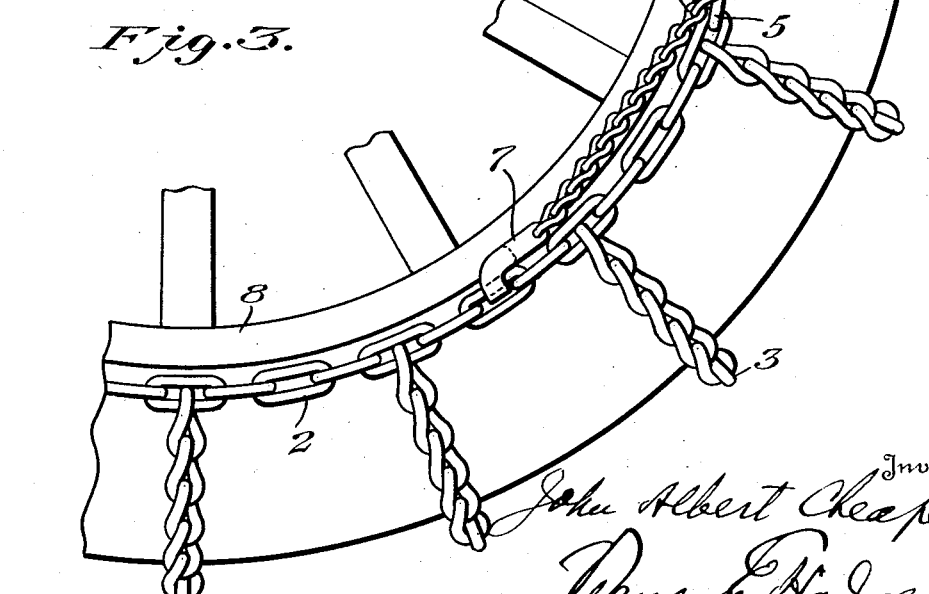
Inventor
John Albert Cheape
By Nelson E. Hodges
His Attorney Patented Feb. 16, 1926.

1,573,631

UNITED STATES PATENT OFFICE.

JOHN ALBERT CHEAPE, OF CHARLOTTESVILLE, VIRGINIA, ASSIGNOR TO EZYON CORPORATION, OF CHARLOTTESVILLE, VIRGINIA, A CORPORATION OF VIRGINIA.

ANTISKID CHAIN.

Application filed March 21, 1925. Serial No. 17,398.

*To all whom it may concern:*

Be it known that I, JOHN ALBERT CHEAPE, a subject of the King of Great Britain, residing at Charlottesville, in the county of Albemarle and State of Virginia, have invented certain new and useful Improvements in Antiskid Chains, of which the following is a specification.

My invention relates to an improvement in anti-skid chains.

The object is to provide a chain that can be quickly applied and removed.

The invention includes two side chains and connecting cross-chains, one side chain of greater length than the other, and slidably and adjustably connected with a link of the chain, whereby the entire anti-skid device is tightened and fastened from a single point.

This invention further includes a device of the character described adapted to be tightened and fastened from one point only.

My invention further includes a device of the character described continuous on one side and extensible and adjustable on the other side.

It further includes two side chains and connecting cross-chains, one of the side chains open and having a slip chain connection secured to one end and slidably connected with the other end and constituting the sole means of tightening and fastening the device upon the wheel.

The invention further consists in a device of the character described, including two side chains and a plurality of cross-chains, one of the side chains continuous, and the other adjustable as to length and held rigidly when adjusted.

In the accompanying drawings:

Fig. 2 is a fragmentary view also from the inside showing the device tightened but not fastened;

Fig. 3 is a similar view showing the final stage with the device fastened.

Figure 1:
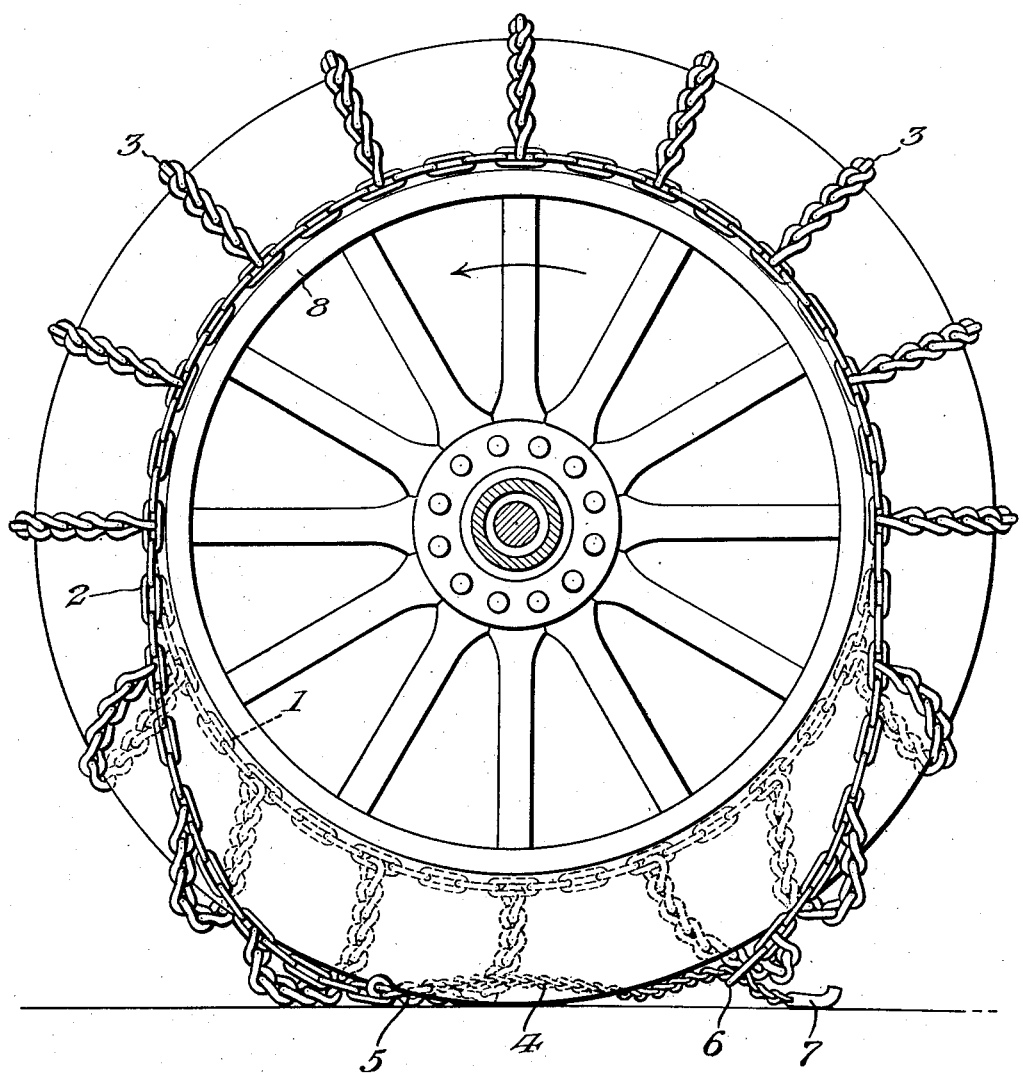
Fig. 1 is a view from the inside of a wheel showing the axle in section with the chain partly applied, showing the first step in applying the device when the wheel is on the ground.

The numeral 1 indicates the outer side chain. This is preferably continuous, or in other words without fastening. The numeral 2 represents the other side chain, the end links of which are represented by the numerals 5 and 6. The numeral 4 indicates a slip-chain extension permanently connected with the link 5, and having a limited slidable connection through the link 6 with a fastener of any approved form 7 on the free end, but preferably of a size to prevent the slip-chain extension from pulling out of the links 6.

The numeral 3 indicates the cross-chains which may be fastened at their ends in any approved manner to the side chains 1 and 2, the conventional showing being one of many that might be employed.

The anti-skid device may be applied to a wheel when it is jacked up, or when it is on the ground. In applying the chain to the wheel 8 when on the ground as illustrated in Fig. 1, I have found it desirable to so place the chain that the adjustment is on the inside of the wheel, and with the part of the chain 4 from 5 to 6 at the bottom of the wheel on the ground after which the parts 5, 6 and 7 are tucked under the wheel.

In Fig. 1, the anti-skid device is shown thrown or draped around the wheel from the outside, the continuous chain 1 taking its natural place, and the chain 2 being sufficiently extensible to permit of a very quick draping of the entire device from the top of the wheel over about three-fourths of its circumference. The machine is then rolled forward perhaps the distance of a foot or so until the wheel crosses over the slip-chain extension 4, which at first is on the outside of the wheel, as illustrated in dotted lines in Fig. 1, and when the wheel is in approximately the position shown in Fig. 2, the parts are in about the most convenient position for fastening, whereupon the slip chain extension 4 is pulled tight as desired through the link 6, and when the entire device is tensioned to suit the operator the fastener 7 is hooked into the link that it comes opposite as viewed in Fig. 3.

In this way the entire anti-skid chain is easily and quickly applied, and it is tightened from a single point by a smart pull on the slip-chain extension 4. This completes the operation of attaching the chain. In other words from this single point both side chains and cross-chains are drawn snugly around the wheel.

To remove the chain, it is simply necessary to unhook the fastener 7, thus permitting the chain 2 to lengthen out. The anti-skid device is then pulled off over the top of the wheel and entirely removed, except the portion beneath the wheel, which portion is entirely removed by rolling the wheel off the device.

Thus it will be seen that a single fastening means is sufficient to fasten the entire anti-skid chain, and fasten it to the position, after which it is held tight by fastening the free end.

I claim:

1. A device of the character described including two side chains and cross-members connecting the same, one of the side chains being continuous and the other side-chain non-continuous or open, with a flexible extension at one end having sliding connection with the other, the extension having means at or near the free end which prevents it from becoming disconnected with the end to which it is slidably connected.

2. A device of the character described including two side-chains, and cross-members connecting the side-chains, one side-chain continuous and the other side-chain open and having an extension at one end having a limited sliding connection with a link at the other end thereof, which extension is adapted to be pulled to apply tension to the entire device when on a wheel, and means on the extension for fastening the free end thereof, said fastening means of sufficient size to prevent it from being pulled through the link with which the extension has sliding connection.

3. A device of the character described including two side chains and connecting cross-chains, one side chain unbroken and continuous, the other side chain having an extension at one end which slides freely through a link in the other end, said extension being non-elastic and having means on its free end for preventing its escape from the link.

In testimony whereof I affix my signature.

JOHN ALBERT CHEAPE.